(12) United States Patent
Roth (10) Patent No.: US 6,494,415 B1
(45) Date of Patent: Dec. 17, 2002

(54) MULTI-PURPOSE HANGER APPARATUS FOR USE WITH A BUILDING STRUCTURE

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 0 days.

(21) Appl. No.: 09/836,919

(22) Filed: Apr. 17, 2001

Related U.S. Application Data (63) Continuation-in-part of application No. 09/769,904, filed on Jan. 25, 2001.

(51) Int. Cl.[7] .................................................. F16L 3/00
(52) U.S. Cl. ........................ 248/74.1; 248/62; 248/909
(58) Field of Search .............................. 248/58, 60, 62, 248/65, 74.1, 558, 909

(56) References Cited

U.S. PATENT DOCUMENTS

| | | | | | |
|---|---|---|---|---|---|
| 2,375,513 | A | * | 5/1945 | Bach ............................ | 248/59 |
| 4,119,285 | A | * | 10/1978 | Bisping et al. ......... | 248/222.12 |
| 4,417,711 | A | * | 11/1983 | Madej ........................ | 248/74.4 |
| 4,479,625 | A | * | 10/1984 | Martz .......................... | 248/62 |
| 5,564,659 | A | * | 10/1996 | DeCapo ...................... | 248/72 |
| 5,799,907 | A | * | 9/1998 | Andronica ................... | 248/62 |
| 5,855,342 | A | * | 1/1999 | Hawkins et al. .............. | 248/55 |

* cited by examiner

Primary Examiner—Korie Chan
Assistant Examiner—Ingrid Weinhold
(74) Attorney, Agent, or Firm—Thomas R. Lampe (57) ABSTRACT

Multi-use hanger apparatus includes a hanger member having a hanger member base with an opening formed therein and legs attached to the hanger member base. Spaced projections are attached to the corners of the hanger member base. The hanger member base is formed of hanger member base portions separated by one or more lines of weakness.

16 Claims, 7 Drawing Sheets

MULTI-PURPOSE HANGER APPARATUS FOR USE WITH A BUILDING STRUCTURE

This application is a continuation-in-part of U.S. application Ser. No. 09/769,904, filed Jan. 25, 2001.

TECHNICAL FIELD

This invention relates to multi-purpose hanger apparatus that can be used to support either a channel member or a conduit from building structure.

BACKGROUND OF THE INVENTION

There are many hanger devices and arrangements for supporting conduits or pipes and channels from building structure. Several arrangements particularly devised for such purpose and employed in the prior art are described below. Some hanger devices are particularly designed to support channels and others are particularly devised to support conduits or pipes having a round outer configuration or other configurations. Use of such devices is limited to the particular application for which it is designed. For example, a conventional hanger designed for supporting a channel is not normally useable to support a conduit and vice versa.

As will be seen in greater detail below, the hanger apparatus of the present invention has multi-use capability. In one configuration the hanger apparatus can be employed to support a channel from a conduit and in another configuration the hanger apparatus can be employed to support a pipe or other conduit from a hanger rod.

The hanger apparatus incorporates separable hanger rod member base portions. When the hanger member base portions are secured together, the hanger apparatus can be employed to support a conduit from a hanger rod. When the hanger member base portions are separated, the hanger apparatus can be employed to support a channel.

As will be shown in greater detail below, it is known in the prior art to frangibly interconnect segments of a channel hanger in order to maintain the segments as a unit until installation is required. The channel hanger segments are separated from one another by breaking them apart at a line of weakness. The channel hanger segments are then separately connected to a channel and an associated conduit or other support.

It is important to note, however, that the prior art devices are maintained as a unit before breaking for convenience purposes only. Shipment and storage of the units is facilitated. The devices cannot be utilized to hang a structural member of any type from a hanger rod.

DISCLOSURE OF INVENTION

As stated above, the hanger apparatus of the present invention is of a multi-use character. The user can employ the hanger apparatus in unaltered or unseparated form to provide support from a hanger rod or in altered or separated form to support a channel from a conduit or other structure.

The hanger apparatus includes a hanger member having a hanger member base and first and second hanger member legs extending from the hanger member base and defining a void therebetween. The hanger member legs have spaced hanger member leg distal ends.

Retainer means comprising a plurality of spaced projections is attached to the hanger member base. The projections project from the hanger member base in the general direction of the spaced hanger member leg distal ends and have spaced projection distal ends positioned away from the hanger member base and the hanger member legs.

The hanger member base includes two hanger member base portions separated by at least one line of weakness allowing the hanger member base portions to be separated by applying external forces to the hanger apparatus.

Other features, advantages and objects of the present invention will become apparent with reference to the following description and accompanying drawings.

MODES FOR CARRYING OUT THE INVENTION

Figure 1A:
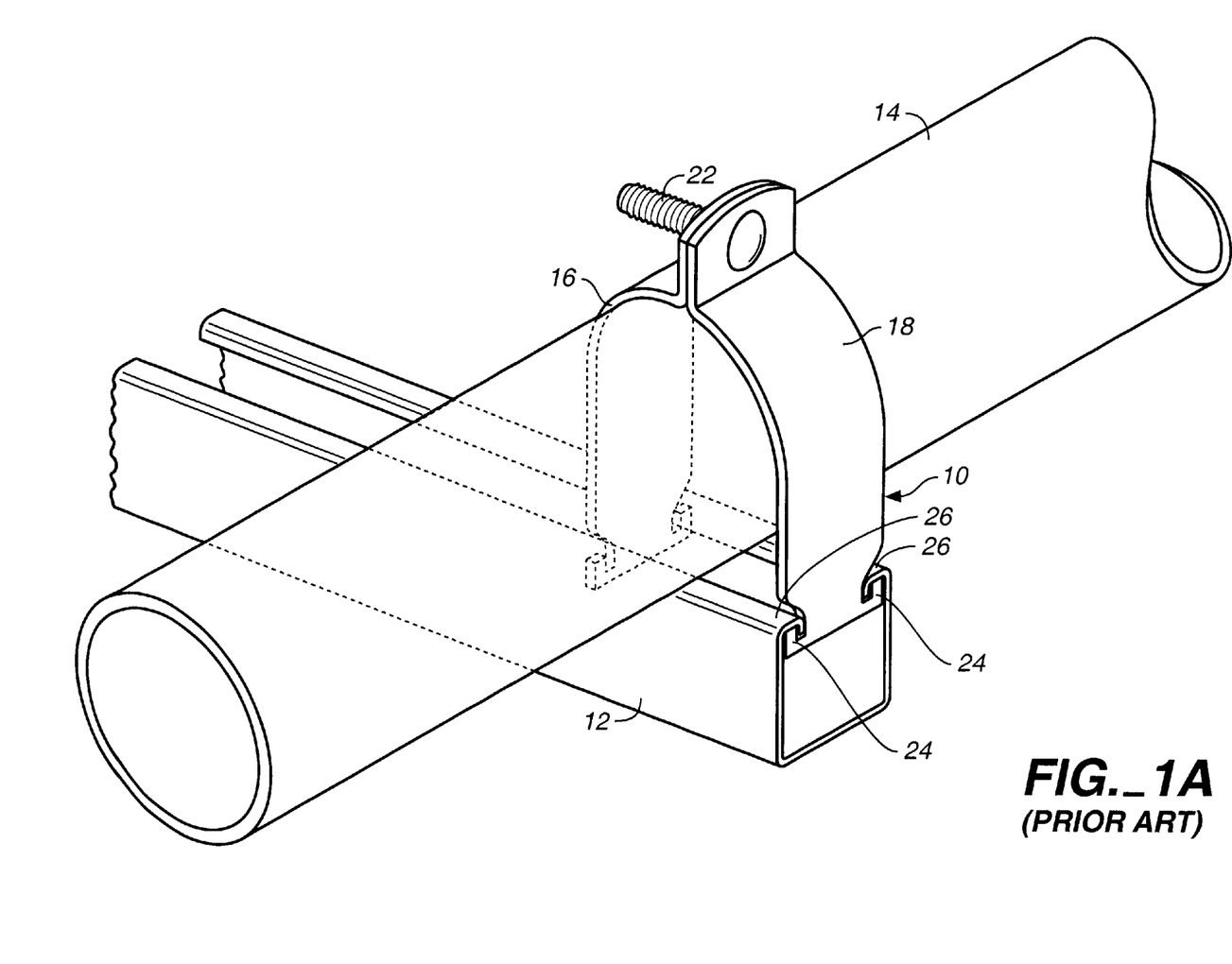
FIG. 1A shows a prior art hanger employed to support a channel from a conduit.
Figure 1B:
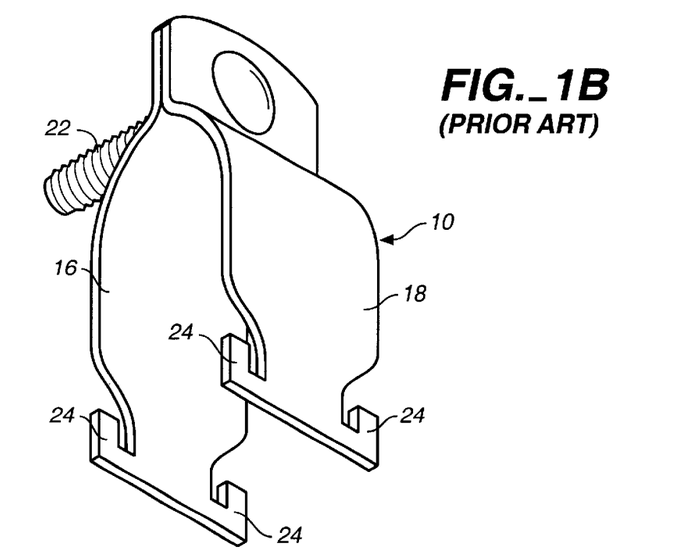
FIG. 1B is a perspective view of the prior art hanger apparatus of FIG. 1A after it has been formed into two segments from a unitary structure.
Figure 1C:
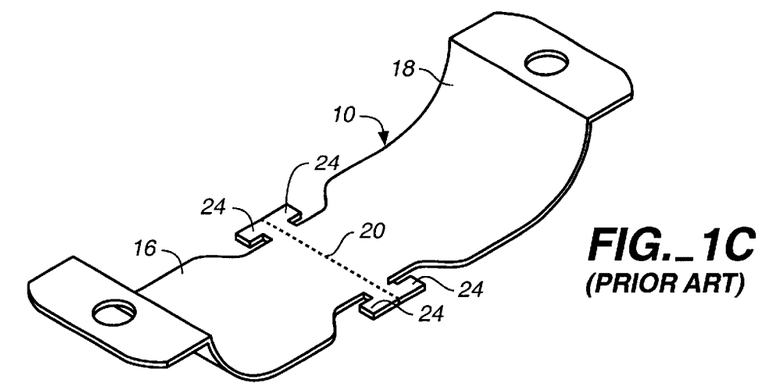
FIG. 1C is a perspective view illustrating segments of the prior art hanger apparatus of FIG. 1A secured together as a unit along a line of weakness or separation.

FIGS. 1A–1C illustrate prior art hanger apparatus 10 conventionally employed to support a channel 12 from a conduit 14. The hanger apparatus 10 is often sold in the unitary configuration shown in FIG. 1C. Hanger apparatus 10 includes hanger member legs 16, 18 secured together at ends thereof along a line of weakness 20. The purpose of maintaining this unitary structure is to facilitate shipping and storage. When use is desired, the legs 16, 18 are manipulated and a break is formed along line of weakness 20. The legs 16, 18 are deployed over and on opposite sides of a conduit 14 as shown in FIG. 1A and held together at the upper ends thereof by a mechanical fastener 22.

Figure 1D:
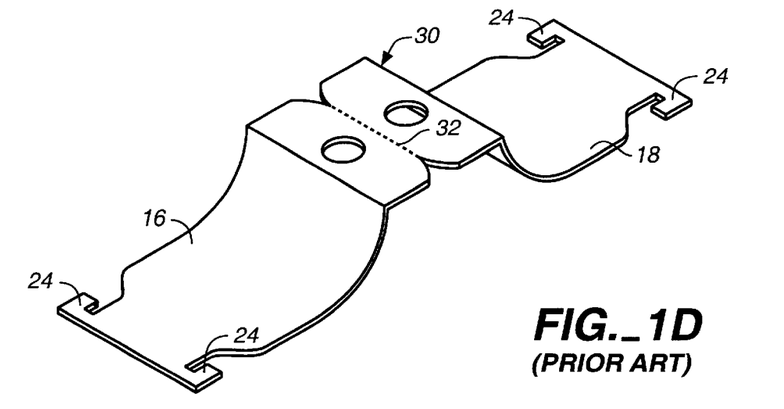
FIG. 1D is a view similar to FIG. 1C showing an alternative prior art hanger apparatus wherein the segments are secured together along a line of weakness.

Located at the other ends of the legs 16, 18 are projections or tabs 24 which project upwardly and are placed in engagement with the underside of lips 26 to support channel 12 from the conduit. It is to be noted that the hanger apparatus of FIGS. 1A–1C is dedicated to such purpose and cannot be used, for example, to support a structural member from a hanger rod. FIG. 1D shows another form of prior art hanger apparatus, designated by reference numeral 30, which is utilized for the same dedicated purpose. In this instance, the line of separation or weakness 32 is at the upper ends of the adjoining legs. It is also known to form a line of weakness between sides of adjoining legs. Again, the hanger apparatus 30 and similar arrangements such as that wherein sides of adjoining leg sides are frangibly interconnected cannot be employed to support a conduit from a hanger rod.

Figure 2A:
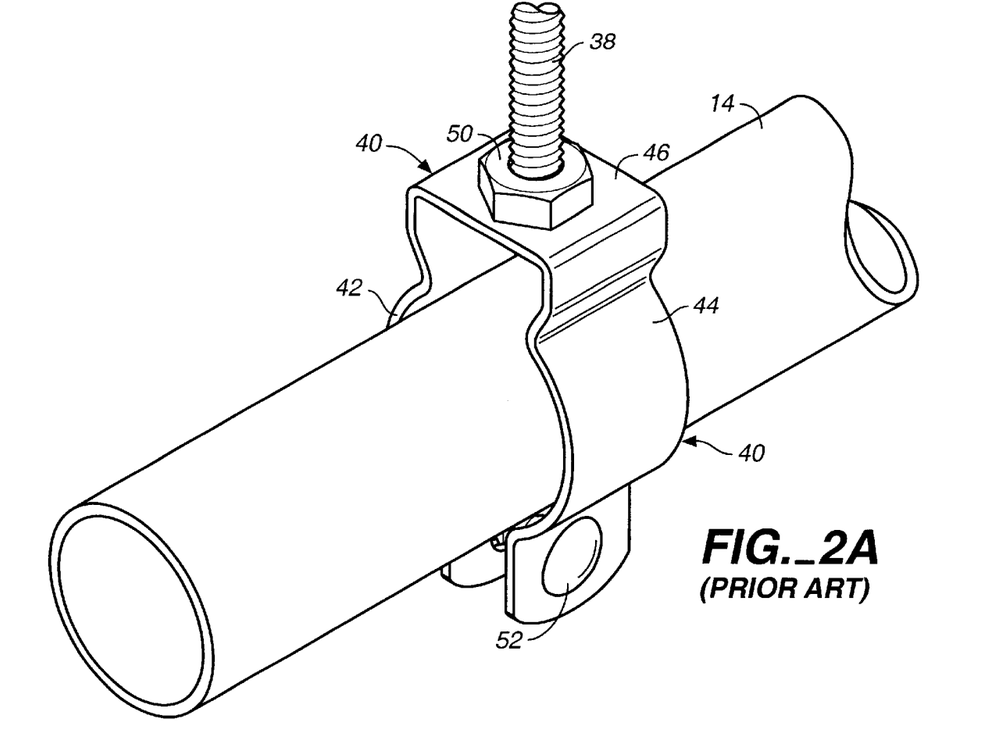
FIG. 2A is a perspective view of another conventional hanger utilized to support a conduit from a hanger rod.
Figure 2B:
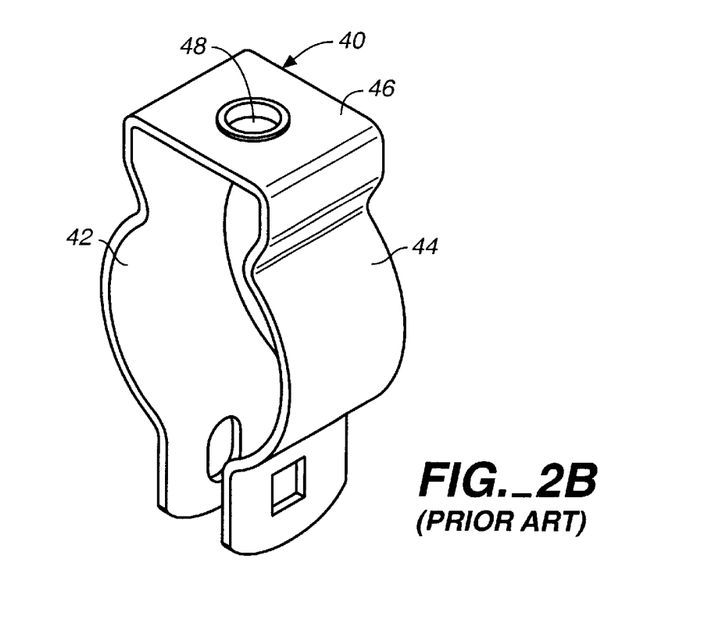
FIG. 2B is a perspective view showing details of the hanger apparatus of FIG. 2A.

FIGS. 2A and 2B illustrate a type of hanger apparatus commonly employed to support a conduit 14 from a hanger rod 38. This form of prior art hanger apparatus 40 includes two legs 42, 44 connected at the upper ends thereof to a hanger member base 46 in which an opening 48 is formed. The hanger apparatus 40 remains in the same configuration during both use and non-use and is dedicated solely to the purpose of supporting a conduit from a hanger rod. The hanger rod 38 is positioned in opening 48 and the hanger apparatus and hanger rod are secured together by threaded connectors such as nut 50. The hanger apparatus 40 has the lower ends of the legs 42, 44 thereof secured together by a threaded fastener 52 to clamp the hanger apparatus about the conduit. The arrangement shown in FIGS. 2A and 2B cannot be employed to support a channel and the legs and hanger member base thereof are permanently secured together.

It can be seen from the above that separate types of hanger apparatus must be employed by a user depending upon whether a conduit or channel is to be supported and whether or not the hanger depends from a conduit or hanger rod. This requires maintenance of separate inventories, separate ordering and all of the other problems associated with having to have specific parts for a particular hanger job.

Figure 3A:
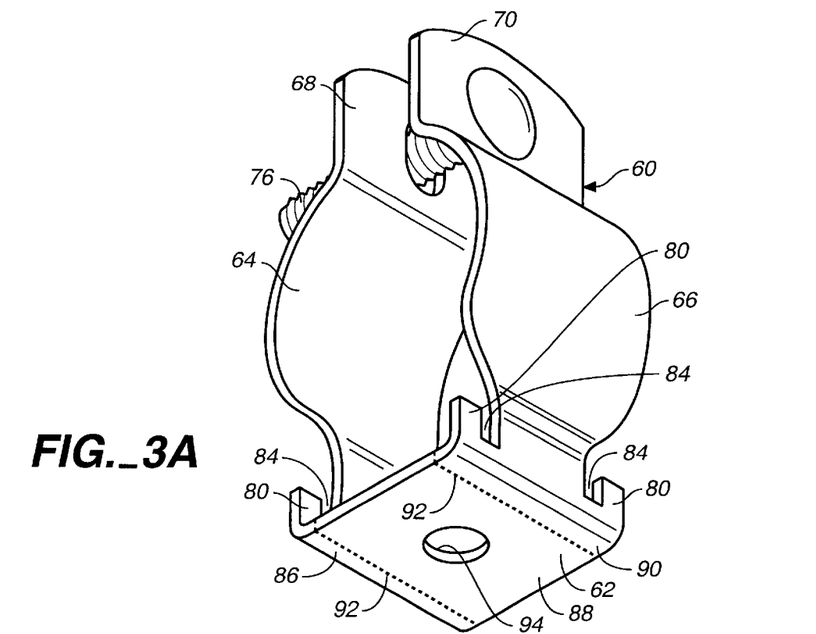
FIG. 3A is a perspective view of a form of hanger apparatus constructed in accordance with the teachings of the present invention, the hanger apparatus shown with all of its elements connected together.
Figure 3B:
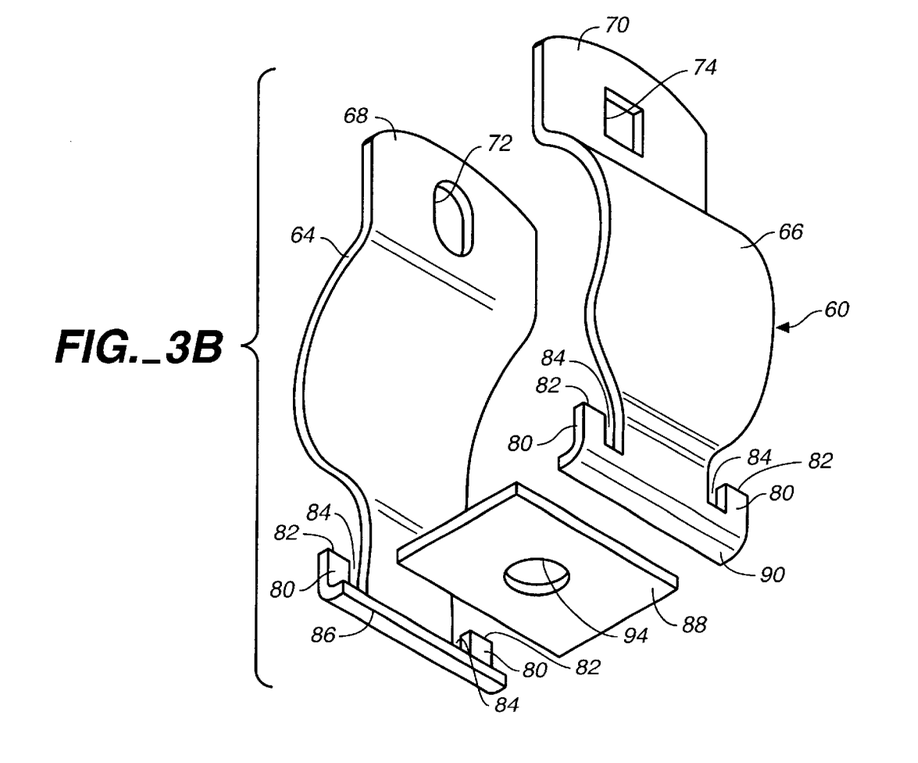
FIG. 3B is an exploded, perspective view showing components of the hanger member of FIG. 3A after separation thereof.
Figure 4:
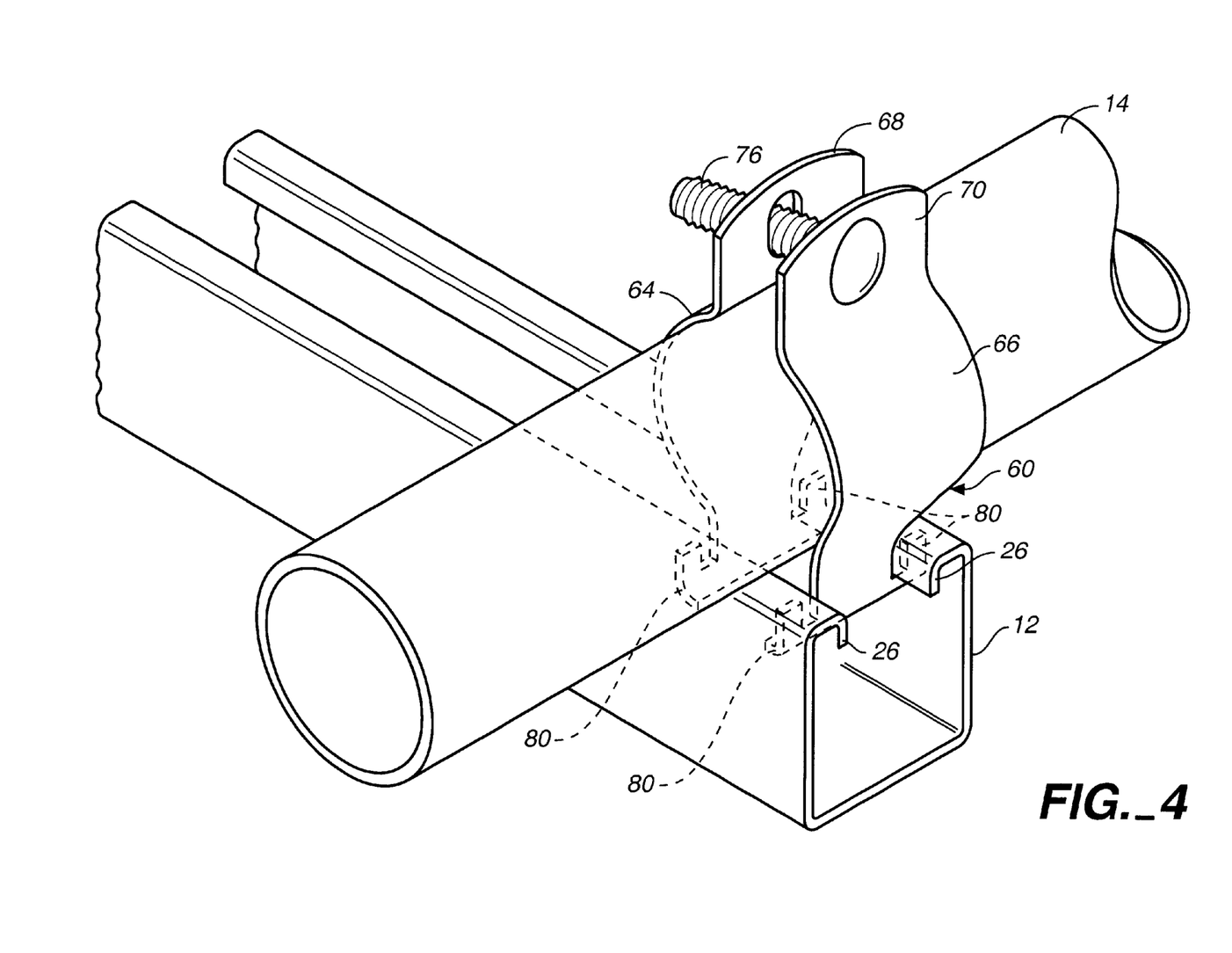
FIG. 4 illustrates the embodiment of the invention shown in FIGS. 3A and 3B utilized to support a channel from a conduit.

FIGS. 3A and 3B show a first embodiment of hanger apparatus constructed in accordance with the teachings of the present invention. The hanger apparatus is identified by reference numeral 60. The hanger apparatus includes a hanger member including a rectangularly shaped hanger member base 62 and hanger member legs 64, 66 extending from the hanger member base and defining a void therebetween. The hanger member legs have spaced hanger member distal ends 68, 70. The hanger member legs are curved for conforming to the shape of a conduit having a round outer surface when the conduit is positioned in the void. FIG. 4 illustrates a conduit 14 so positioned. Leg distal ends 68, 70 respectively define holes 72, 74 for receiving a threaded fastener 76.

Four spaced projections 80 are attached to the hanger member base 62, the projections projecting from the hanger member base in the general direction of the spaced hanger member leg distal ends. The projections 80 are located at the four corners of the rectangular-shaped hanger member base. The projections have distal ends forming straight structural channel bearing surfaces 82 which are parallel to the hanger member base.

The distal ends 82 of the projections 80 are positioned away from the hanger member base and the hanger member legs. The projections are spaced from the legs. The legs, hanger member base and projections define notches 84.

The hanger member base 62 is divided into three base portions 86, 88 and 90. The central base portion 88 is separated from base portions 86 and 90 by lines of weakness 92. These lines of weakness are parallel and may be, for example, lines along which perforations or one or more indents are formed. Leg 64 is affixed to base portion 86 and leg 66 is attached to base portion 90. The base portions 86, 88 and 90 each have a rectangular shape.

An opening 94 is centrally disposed in hanger member base 62 and more particularly the opening is formed in central base portion 88.

Figure 5:
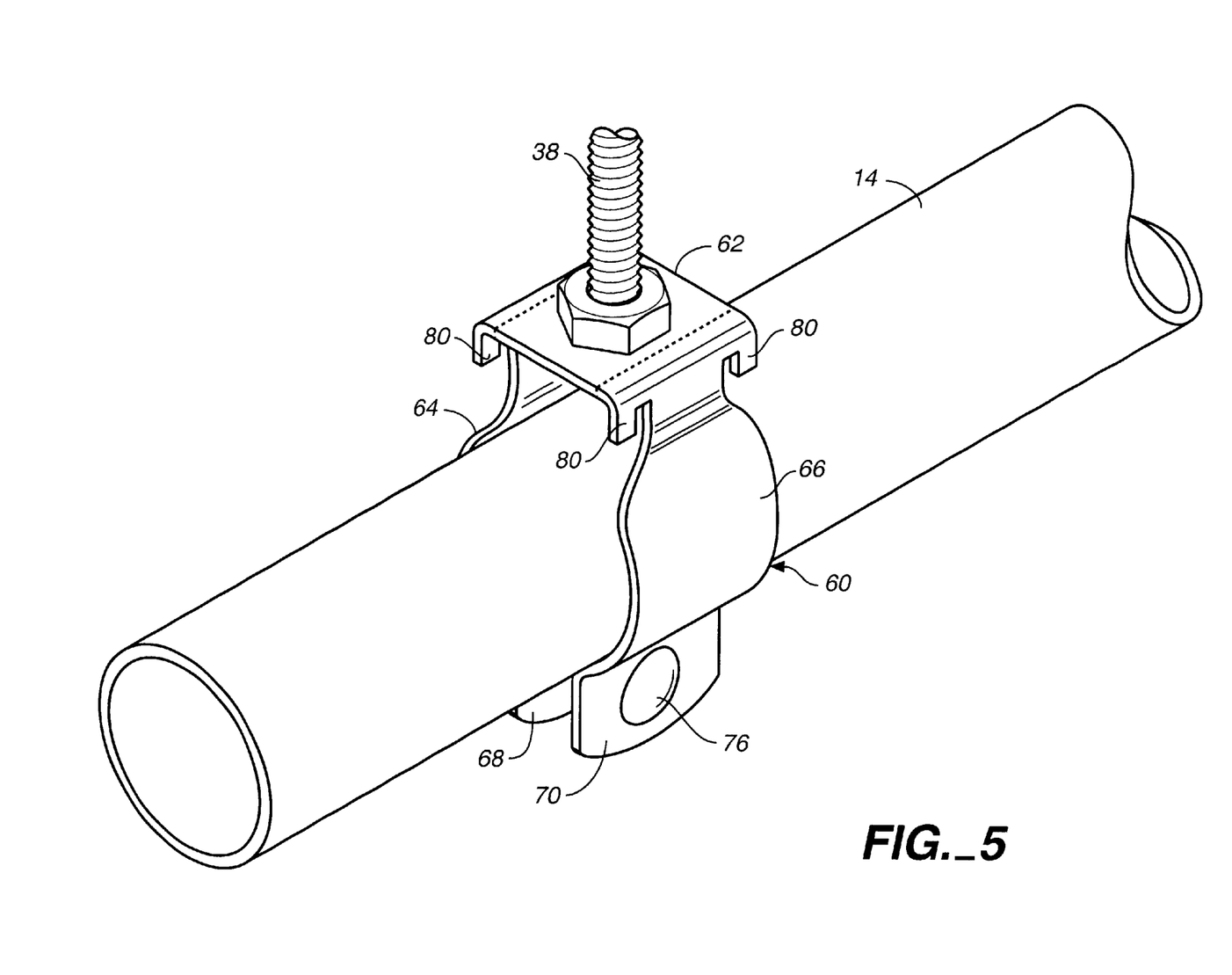
FIG. 5 is a perspective view illustrating the embodiment of FIGS. 3A and 3B utilized to support a conduit from a hanger rod.

The hanger apparatus 60 may be utilized in two configurations or forms. Referring now to FIG. 5, the hanger apparatus 60 is utilized totally intact to support conduit 14 from a hanger rod 38, in much the same manner a conventional hanger apparatus of the type shown in FIGS. 2A and 2B is utilized. Alternatively, the hanger apparatus 60 may be utilized as shown in FIG. 4 to support a channel 12 from a conduit 14. The arrangement or configuration shown in FIG. 4 is created by applying forces to the hanger apparatus 60 to break the hanger member base 62 along lines of weakness 92 to separate base portion 88 from the rest of the hanger apparatus. In the FIG. 4 arrangement the legs 64 and 66 along with the projections 80 associated therewith are completely separated from one another, the projections 80 being disposed under the lips 26 of the channel member with the bearing surfaces 82 thereof in engagement with the undersides of the lips.

Figure 6A:
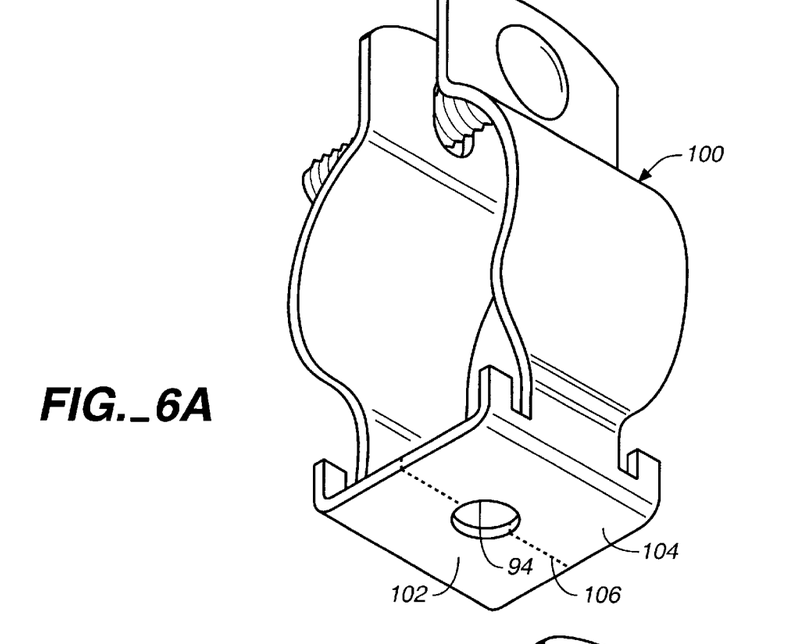
FIG. 6A is a view similar to FIG. 3A but illustrating an alternate embodiment of the invention.
Figure 6B:
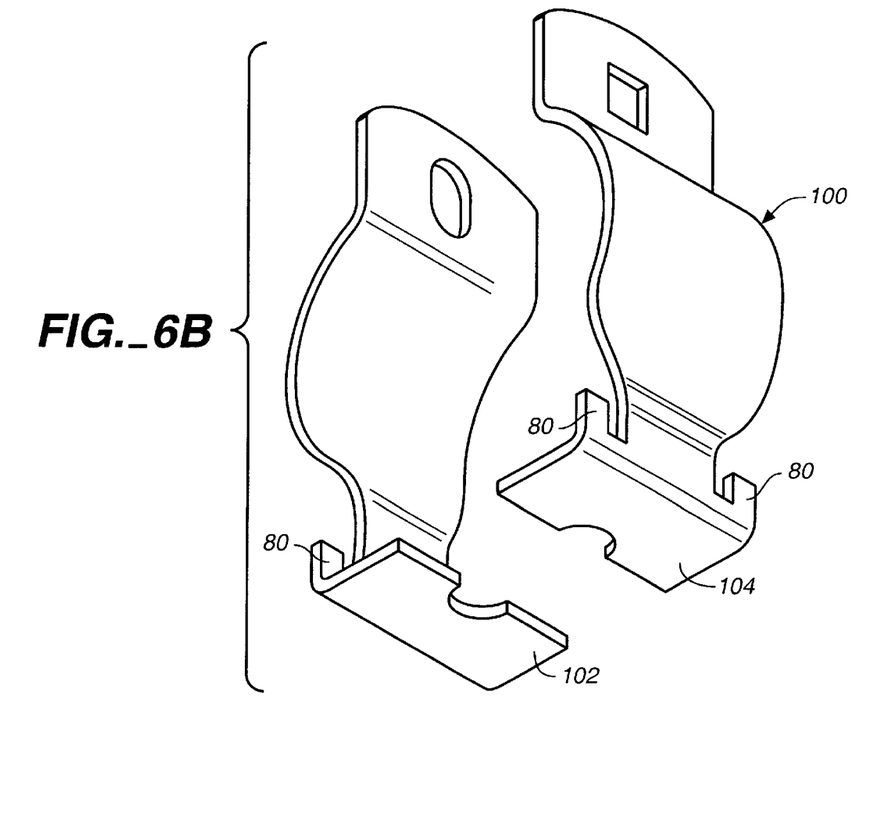
FIG. 6B is a view similar to FIG. 3B but illustrating the alternate embodiment of the invention.

FIGS. 6A and 6B illustrate an alternative embodiment of the apparatus, hanger apparatus 100. In this instance, the hanger member base of the apparatus is divided into two base portions 102, 104. The base portions are separated by a single line of weakness 106 which communicates with opening 94 in the hanger member base. The installation utilizing the hanger apparatus 100 is the same as that shown in FIG. 4 with respect to the first embodiment described above.

The embodiments illustrated and described are merely exemplary of forms of hanger apparatus which may be constructed in accordance with the teachings of the present invention. For example, lines of weakness may be formed at the location of the bottoms of the legs leaving only those portions of the hanger member base which interconnect the projections to the legs. That is, the remaining base portions may have the same thickness as the legs and not extend horizontally from the leg inner surfaces.

The invention claimed is:

1. Hanger apparatus comprising, in combination:

a hanger member including a hanger member base and first and second hanger member legs extending from opposed sides of said hanger member base and defining a void therebetween, said hanger member legs having spaced hanger member leg distal ends; and retainer means comprising a plurality of spaced projections attached to said hanger member base, said projections projecting from said hanger member base in the general direction of the spaced hanger member leg distal ends and having spaced projection distal ends positioned away from said hanger member base and spaced from said hanger member legs, said hanger member base including two hanger member base portions separated by at least one line of weakness allowing said hanger member base portions to be separated by applying external forces to the hanger apparatus, said hanger member base defining an opening surrounded by said hanger member base for receiving a hanger rod.

2. The hanger apparatus according to claim 1 wherein at least two of said projections are attached to each of said hanger member base portions.

3. The hanger apparatus according to claim 2 wherein said first hanger member leg is affixed to and extends from one of said hanger member base portions and the second hanger member leg is affixed to and extends from the other of said hanger member base portions.

4. The hanger apparatus according to claim 1 wherein said opening is generally disposed in the center of said hanger member base.

5. The hanger apparatus according to claim 1 wherein said opening communicates with said at least one line of weakness.

6. The hanger apparatus according to claim 2 wherein said hanger member base portions each have a rectangular configuration and have spaced outer corners, one of said projections being located at each of said outer corners.

7. The hanger apparatus according to claim 1 wherein said two hanger member base portions are separated by two spaced lines of weakness, a selectively removable third hanger member base portion being located between said two spaced lines of weakness.

8. The hanger apparatus according to claim 7 wherein said third hanger member base portion defines said opening.

9. The hanger apparatus according to claim 1 wherein said projections are spaced from said hanger member legs and define notches with said hanger member legs.

10. The hanger apparatus according to claim 1 wherein said hanger member legs are curved for conforming to the shape of a conduit having a round outer surface when said conduit is positioned in said void.

11. The hanger apparatus according to claim 1 wherein said hanger member leg distal ends define holes for receiving a mechanical fastener employed to clamp the hanger apparatus to a structural member.

12. The hanger apparatus according to claim 1 wherein said hanger member base has a rectangular configuration and has four corners, a projection being located at each of said corners, said projections engageable with the underside of inturned lips of a channel.

13. The hanger apparatus according to claim 12 wherein each of the projection distal ends has a straight structural channel bearing surface substantially parallel to said hanger member base.

14. Hanger apparatus comprising, in combination:

a hanger member including a hanger member base and first and second hanger member legs extending from said hanger member base and defining a void therebetween, said hanger member legs having spaced hanger member leg distal ends; and retainer means comprising a plurality of spaced projections attached to said hanger member base, said projections projecting from said hanger member base in the general direction of the spaced hanger member leg distal ends and having spaced projection distal ends positioned away from said hanger member base and spaced from said hanger member legs, said hanger member base including two hanger member base portions separated by at least one line of weakness allowing said hanger member base portions to be separated by applying external forces to the hanger apparatus, said hanger member base defining an opening for receiving a hanger rod, said opening being generally disposed in the center of said hanger member base.

15. Hanger apparatus comprising, in combination:

a hanger member including a hanger member base and first and second hanger member legs extending from said hanger member base and defining a void therebetween, said hanger member legs having spaced hanger member leg distal ends; and retainer means comprising a plurality of spaced projections attached to said hanger member base, said projections projecting from said hanger member base in the general direction of the spaced hanger member leg distal ends and having spaced projection distal ends positioned away from said hanger member base and spaced from said hanger member legs, said hanger member base including two hanger member base portions separated by at least two spaced lines of weakness allowing said hanger member base portions to be separated by applying external forces to the hanger apparatus, a selectively removable third hanger member base portion being located between said two spaced lines of weakness.

16. The hanger apparatus according to claim 15 wherein said third hanger member base portion defines an opening for receiving a hanger rod.

* * * * *